US011515592B2

(12) United States Patent
Nagai et al.

(10) Patent No.: US 11,515,592 B2
(45) Date of Patent: Nov. 29, 2022

(54) BATTERY MODULE

(71) Applicant: Toyota Jidosha Kabushiki Kaisha, Toyota (JP)

(72) Inventors: Hiroki Nagai, Aichi-ken (JP); Keiji Kaita, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 17/009,923

(22) Filed: Sep. 2, 2020

(65) Prior Publication Data
US 2021/0167340 A1   Jun. 3, 2021

(30) Foreign Application Priority Data

Dec. 2, 2019   (JP) .............................. JP2019-218299

(51) Int. Cl.
*H01M 50/10*   (2021.01)
*H01M 10/613*   (2014.01)
*H01M 10/625*   (2014.01)
*H01M 10/655*   (2014.01)

(52) U.S. Cl.
CPC ......... *H01M 50/10* (2021.01); *H01M 10/613* (2015.04); *H01M 10/625* (2015.04); *H01M 10/655* (2015.04); *H01M 2220/20* (2013.01)

(58) Field of Classification Search
CPC .. H01M 50/10; H01M 10/613; H01M 10/625; H01M 10/655; H01M 2220/20
See application file for complete search history.

(56) References Cited

U.S. PATENT DOCUMENTS

2021/0050638 A1* 2/2021 Choi ..................... H01M 50/211

FOREIGN PATENT DOCUMENTS

| CN | 209592104 U | 11/2019 | |
|---|---|---|---|
| JP | 2011-103249 A | 5/2011 | |
| JP | 2011103249 A * | 5/2011 | ............ H01G 11/00 |
| JP | 2014-063685 A | 4/2014 | |

\* cited by examiner

Primary Examiner — Karie O'Neill Apicella
(74) Attorney, Agent, or Firm — Dinsmore & Shohl LLP

(57) ABSTRACT

A battery module includes a secondary battery, a cooler, and a heat conducting member disposed between the secondary battery and the cooler. The secondary battery has at least one electrode body and a case. The case has an opposite wall facing the cooler. The opposite wall has a recessed groove shaped so as to be depressed toward the inside of the case. The heat conducting member fills a space between the opposite wall and the cooler including the inside of the recessed groove.

5 Claims, 8 Drawing Sheets

BATTERY MODULE

CROSS-REFERENCE TO RELATED APPLICATION

This application claims priority to Japanese Patent Application No. 2019-218299 filed on Dec. 2, 2019, incorporated herein by reference in its entirety.

BACKGROUND

1. Technical Field

This disclosure relates to a battery module.

2. Description of Related Art

A secondary battery including a plurality of electricity storage elements and a battery case housing the electricity storage elements is disclosed, for example, in Japanese Patent Application Publication No. 2011-103249 (JP 2011-103249 A). The battery case is composed of a bottom surface, a side surface, and a top lid. The bottom surface is formed flat. The electricity storage elements are pressed against at least one of the side surface and the top lid by being urged by an elastic member.

SUMMARY

When cooling the secondary battery described in JP 2011-103249 A by a cooler, it is conceivable to cool the case, for example, by providing a heat conducting member between the bottom surface of the case and the cooler. Since the bottom surface of the battery case described in JP 2011-103249 A is flat, an area of contact between the case and the heat conducting member is secured for excellent heat dissipation performance.

However, if the bottom surface of the case deforms due to high temperature deterioration, vibration, etc., or the case shifts relatively to the cooler due to vibration etc., the heat conducting member may come off at least one of the case and the cooler, resulting in degradation of the cooling performance.

An object of this disclosure is to provide a battery module that can reduce the likelihood of both deformation of the case and degradation of the cooling performance.

A battery module according to one aspect of the disclosure includes: at least one secondary battery; a cooler that cools the at least one secondary battery; and a heat conducting member disposed between the at least one secondary battery and the cooler so as to bring the at least one secondary battery and the cooler into thermal contact with each other. The at least one secondary battery includes at least one electrode body and a case housing the at least one electrode body. The case has an opposite wall facing the cooler. The opposite wall has a recessed groove shaped so as to be depressed toward an inside of the case. The heat conducting member fills a space between the opposite wall and the cooler including the inside of the recessed groove.

In this battery module, the opposite wall of the case has the recessed groove and the heat conducting member fills the space between the opposite wall and the cooler including the inside of the recessed groove. Thus, compared with when the entire area of the opposite wall is formed flat, the rigidity of the opposite wall is enhanced and, moreover, the area of contact between the heat conducting member and the opposite wall is increased. Therefore, this battery module can reduce the likelihood of both deformation of the case and degradation of the cooling performance.

The heat conducting member may have a cooler-side contact surface that is in contact with the cooler and an opposite-wall-side contact surface that is in contact with the opposite wall including the recessed groove.

The case may have: a bottom wall formed below the at least one electrode body; a peripheral wall standing upright from edges of the bottom wall and shaped so as to surround the at least one electrode body; and an upper wall formed above the at least one electrode body and connected to an upper end of the peripheral wall. The bottom wall may constitute the opposite wall.

The at least one electrode body may include a plurality of electrode bodies that is disposed in a row along a first direction.

In this case, the recessed groove may be formed in the opposite wall at such a position as to overlap, in a thickness direction of the opposite wall, with a gap between electrode bodies that are adjacent to each other in the first direction, and may be shaped so as to extend in a second direction orthogonal to both the first direction and the thickness direction of the opposite wall.

This aspect makes it possible to reduce the likelihood of both deformation of the case and degradation of the cooling performance without reducing the energy density.

Alternatively, the length of the opposite wall in the first direction may be shorter than the length of the opposite wall in a second direction orthogonal to both the first direction and a thickness direction of the opposite wall, and the recessed groove may be shaped so as to extend in a direction parallel to the first direction.

This aspect can enhance the rigidity of the opposite wall against such deformation that the opposite wall bulges outward, and can thereby more reliably reduce the likelihood of deformation of the case.

The at least one secondary battery may include a plurality of secondary batteries, and the heat conducting member may be disposed also in a space between the cooler and a region between adjacent ones of the secondary batteries.

As has been described above, this disclosure can provide a battery module that can reduce the likelihood of both deformation of the case and degradation of the cooling performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
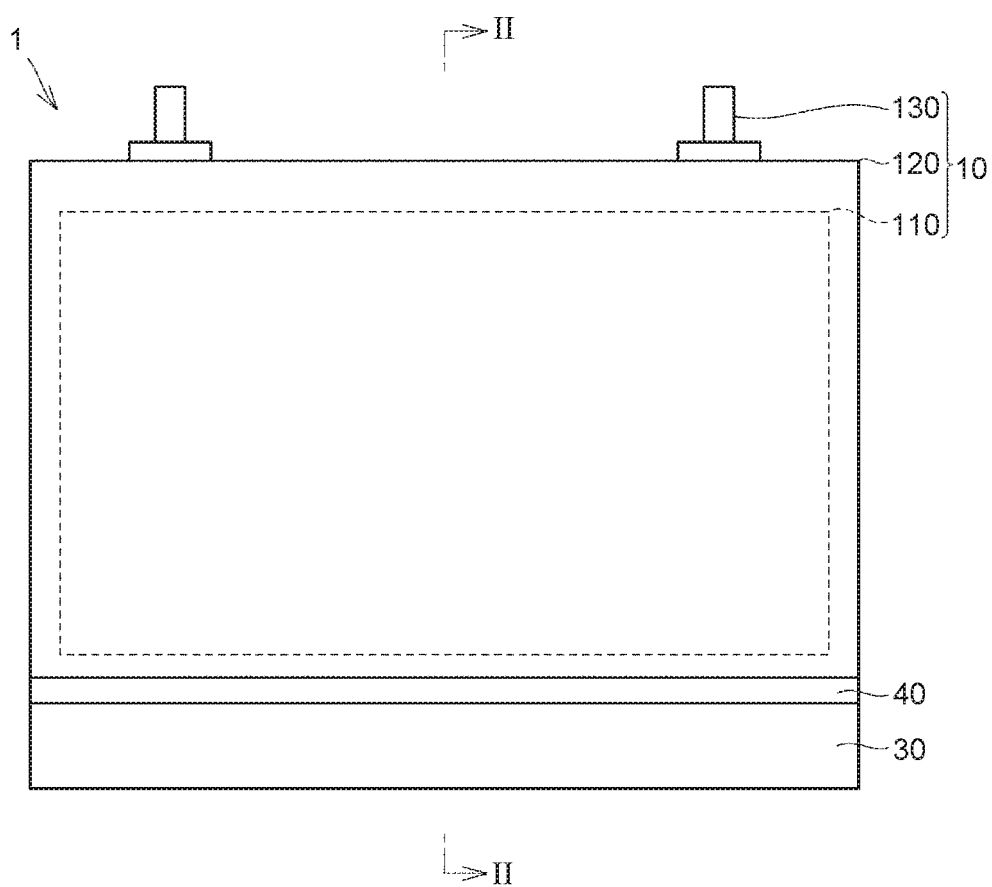
FIG. 1 is a front view schematically showing the configuration of a battery module of a first embodiment of the disclosure.

Embodiments of this disclosure will be described with reference to the drawings. In the drawings referred to below, the same or corresponding members are denoted by the same numbers.

First Embodiment

Figure 2:
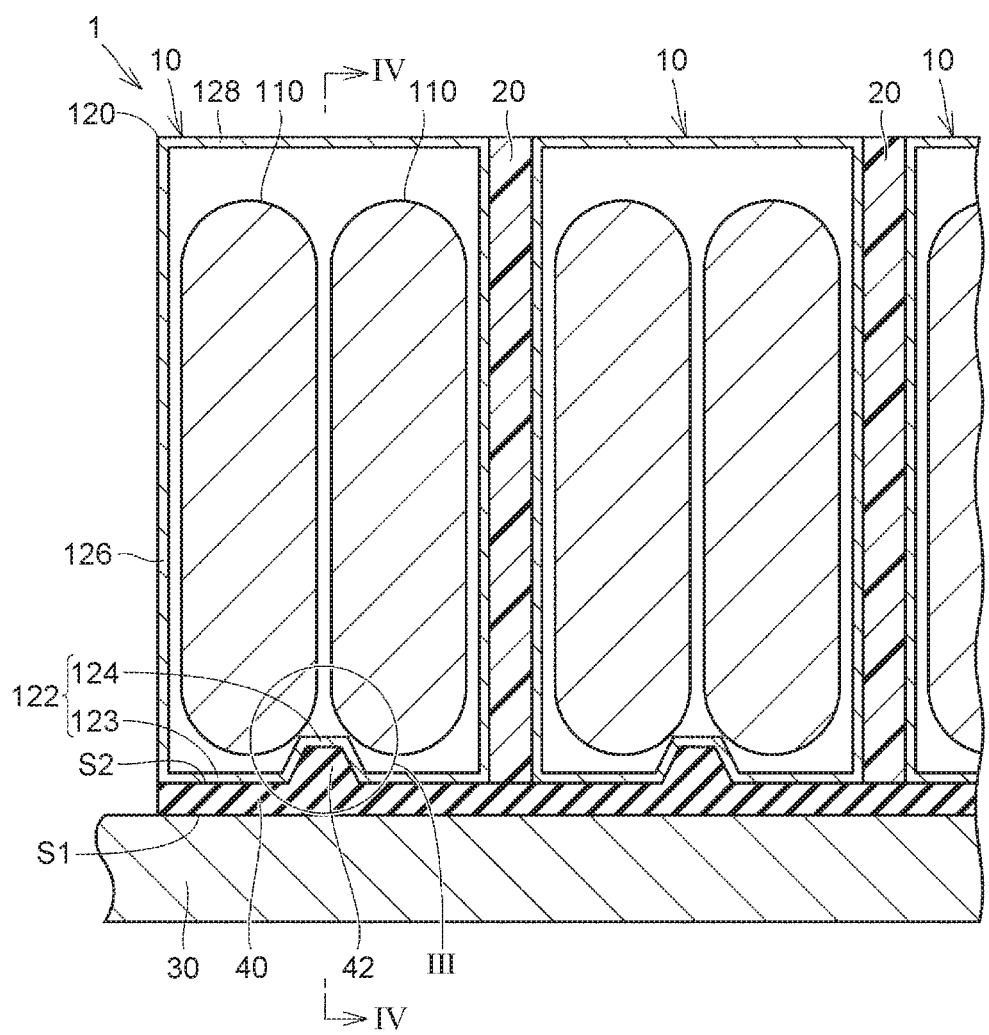
FIG. 2 is a sectional view taken along line II-II in FIG. 1.

FIG. 1 is a front view schematically showing the configuration of a battery module of a first embodiment of the disclosure. FIG. 2 is a sectional view taken along line II-II in FIG. 1. This battery module 1 is mounted, for example, in a vehicle. As shown in FIG. 1 and FIG. 2, the battery module 1 includes at least one secondary battery 10, a spacer 20, a cooler 30, and a heat conducting member 40. In this embodiment, the battery module 1 includes a plurality of secondary batteries 10.

The secondary batteries 10 are disposed in a row along a direction orthogonal to the sheet of FIG. 1. Each secondary battery 10 has at least one electrode body 110, a case 120, and a pair of external terminals 130. In this embodiment, the at least one electrode body 110 includes two electrode bodies 110 that are disposed side by side along a first direction (a left-right direction in FIG. 2).

Each electrode body 110 has an electricity storage element including a positive electrode, a negative electrode, and a separator. Types of the electrode body 110 include one in which electricity storage elements are stacked and one in which electricity storage elements are rolled. As shown in FIG. 2, a lower part of each electrode body 110 has a curved shape that protrudes downward.

The case 120 houses at least one electrode body 110. The case 120 has a rectangular parallelepiped shape. The case 120 has a bottom wall 122, a peripheral wall 126, and an upper wall 128.

The bottom wall 122 is formed below the electrode bodies 110. The bottom wall 122 has a rectangular outer shape. Specifically, the length of the bottom wall 122 in the first direction is shorter than the length of the bottom wall 122 in a second direction (a left-right direction in FIG. 1) orthogonal to both the first direction and a thickness direction of the bottom wall 122.

Figure 4:
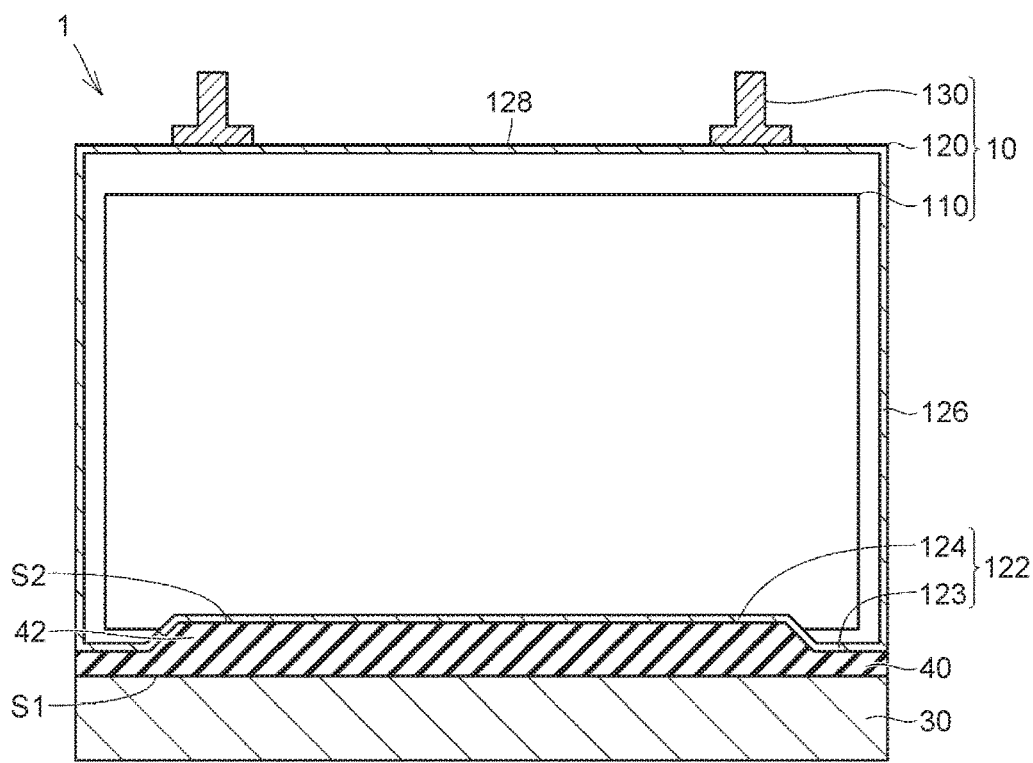
FIG. 4 is a sectional view taken along line IV-IV in FIG. 2.

As shown in FIG. 2 and FIG. 4, the bottom wall 122 has a flat part 123 that is formed flat and a recessed groove 124. The recessed groove 124 is shaped so as to be depressed from the flat part 123 toward an inside of the case 120. The recessed groove 124 is formed in the bottom wall 122 at such a position as to overlap, in the thickness direction of the bottom wall 122, with a gap between the electrode bodies 110 that are adjacent to each other in the first direction. More specifically, the recessed groove 124 overlaps with a lower part of each electrode body 110 in the first direction, and overlaps, in the thickness direction of the bottom wall 122, with the pair of electrode bodies 110 that are adjacent to each other in the first direction. As shown in FIG. 4, the recessed groove 124 is shaped so as to extend in the second direction.

Figure 3:
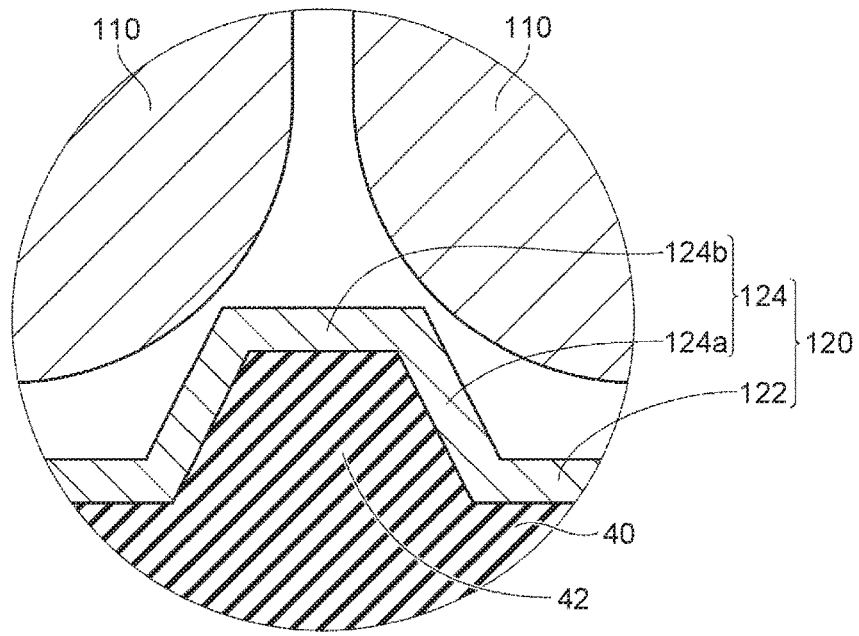
FIG. 3 is an enlarged view of an area indicated by solid line III in FIG. 2.

As shown in FIG. 3, the recessed groove 124 has a pair of inclined portions 124a and a coupling portion 124b.

The pair of inclined portions 124a are shaped so as to incline toward each other as they extend upward from the flat part 123. Each inclined portion 124a is formed flat.

The coupling portion 124b couples together upper ends of the pair of inclined portions 124a. The coupling portion 124b is formed flat.

The height of the recessed groove 124 (the distance between the flat part 123 and the coupling portion 124b) may be set to about 1% to 10% of the height of the peripheral wall 126. The percentage of the surface area of the recessed groove 124 in the entire surface area of the bottom wall 122 may be set to about 5% to 50%.

The peripheral wall 126 stands upright from edges of the bottom wall 122 and is shaped so as to surround at least one electrode body 110. The peripheral wall 126 has a quadrangular tubular shape.

The upper wall 128 is formed above at least one electrode body 110. The upper wall 128 is connected to an upper end of the peripheral wall 126.

The pair of external terminals 130 are provided on the upper wall 128. One of the pair of external terminals 130 is a positive electrode terminal and the other is a negative electrode terminal. The pair of external terminals 130 are disposed at positions apart from each other in the second direction. The pair of external terminals 130 are shaped so as to protrude upward from the upper wall 128. The secondary batteries 10 are electrically connected in series by a bus bar (not shown).

The spacer 20 is disposed between the secondary batteries 10 that are adjacent to each other. Specifically, the spacer 20 is disposed between a pair of peripheral walls 126 that are adjacent to each other in the first direction. The spacer 20 is made of an insulating material, such as resin.

The cooler 30 is a device that cools at least one secondary battery 10. The cooler 30 is disposed below the secondary batteries 10. Thus, in this embodiment, the bottom wall 122 constitutes the "opposite wall" that faces the cooler 30. Alternatively, for example, the cooler 30 may be disposed on a lateral side of the secondary batteries 10 and the peripheral wall 126 may constitute the opposite wall.

As shown in FIG. 2, the cooler 30 is shaped so as to extend in the array direction of the secondary batteries 10. The cooler 30 is made of aluminum or the like and has a tubular shape. The cooler 30 is configured such that a refrigerant flows through an inside of the cooler 30.

The heat conducting member 40 is disposed between at least one secondary battery 10 and the cooler 30 so as to bring the at least one secondary battery 10 and the cooler 30 into thermal contact with each other. In this embodiment, the heat conducting member 40 is disposed between the cooler 30 and the bottom wall 122 constituting the opposite wall. One example of the heat conducting member 40 is a heat-dissipating adhesive.

The heat conducting member 40 fills a space between the bottom wall 122 and the cooler 30 including an inside of the recessed groove 124. The heat conducting member 40 has a protrusion 42 disposed inside the recessed groove 124. The heat conducting member 40 has a cooler-side contact surface S1 that is in contact with the cooler 30 and an opposite-wall-side contact surface S2 that is in contact with the bottom wall 122 including the recessed groove 124. The opposite-wall-side contact surface S2 is in contact with a lower surface of the flat part 123 and a lower surface of the recessed groove 124. In this embodiment, the heat conducting member 40 is disposed also in a space between the cooler 30 and a region where the spacer 20 is disposed (a region between the secondary batteries 10 that are adjacent to each other).

The battery module 1 having been described above is manufactured as follows: The heat conducting member 40 having fluidity is supplied onto an upper surface of the cooler 30, and the secondary batteries 10 are placed on the heat conducting member 40. Thus, the heat conducting member 40 having fluidity enters inside the recessed groove 124 of the bottom wall 122 and cures there.

As has been described above, in the battery module 1 of this embodiment, the bottom wall 122 constituting the opposite wall has the recessed groove 124 and the heat conducting member 40 fills the space between the bottom wall 122 and the cooler 30 including the inside of the recessed groove 124. Thus, compared with when the entire area of the bottom wall 122 is formed flat, the rigidity of the bottom wall 122 is enhanced and, moreover, the area of contact between the heat conducting member 40 and the bottom wall 122 is increased. Therefore, the battery module 1 can reduce the likelihood of both deformation of the case 120 and degradation of the cooling performance.

In this embodiment, the recessed groove 124 is formed in the bottom wall 122 at such a position as to overlap, in the thickness direction of the bottom wall 122, with the gap between the electrode bodies 110 that are adjacent to each other in the first direction, and is shaped so as to extend in the second direction. This makes it possible to reduce the likelihood of both deformation of the case 120 and degradation of the cooling performance without reducing the energy density.

Second Embodiment

Next, the battery module 1 of a second embodiment of this disclosure will be described with reference to FIG. 5. For the second embodiment, only differences from the first embodiment will be described and the same structures, workings, and effects as in the first embodiment will not be described again.

Figure 5:
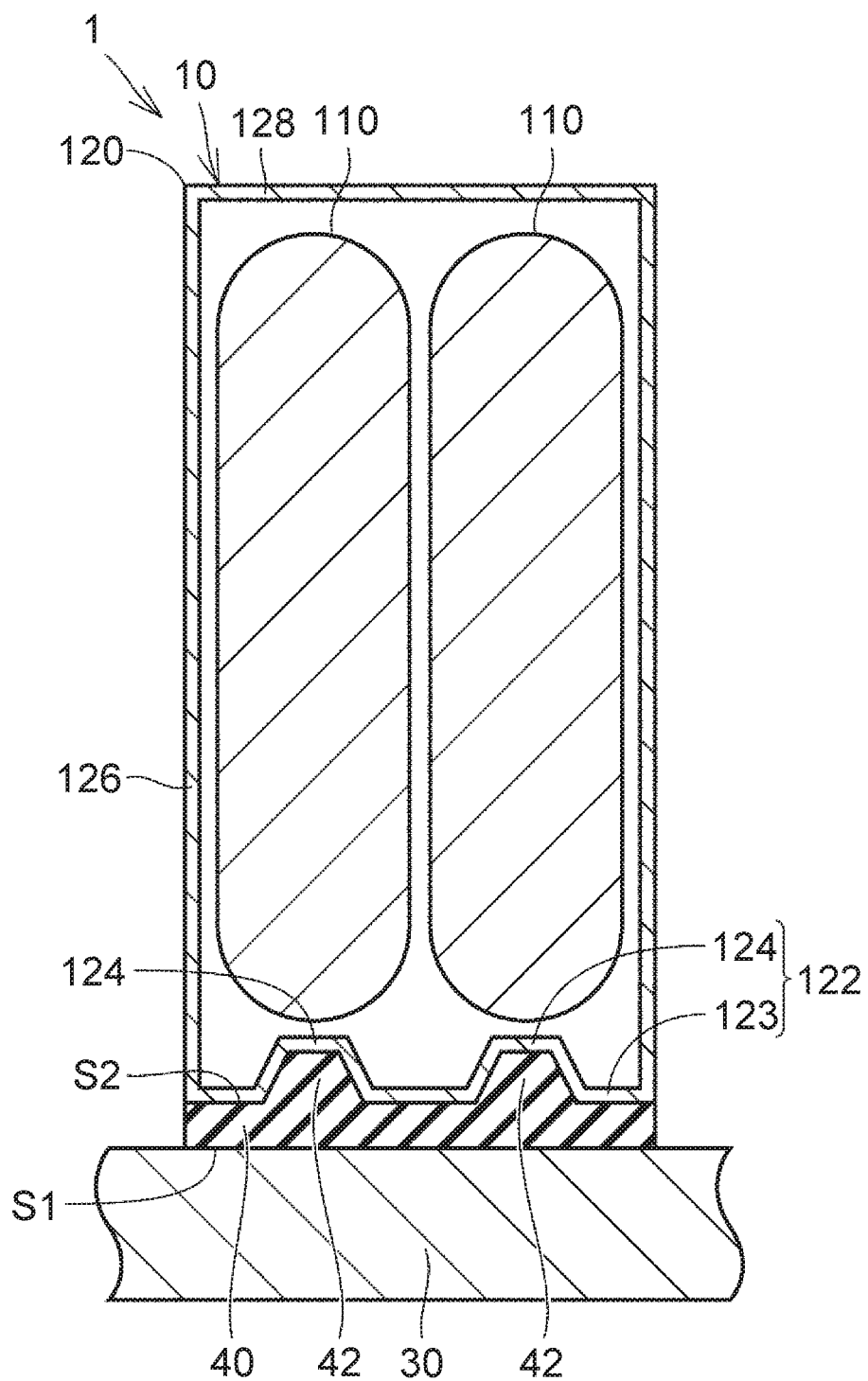
FIG. 5 is a sectional view schematically showing the configuration of a battery module of a second embodiment of the disclosure.

In this embodiment, the recessed grooves 124 are formed at such positions as to overlap with the respective electrode bodies 110 in the thickness direction of the bottom wall 122 (an up-down direction in FIG. 5).

Figure 6:
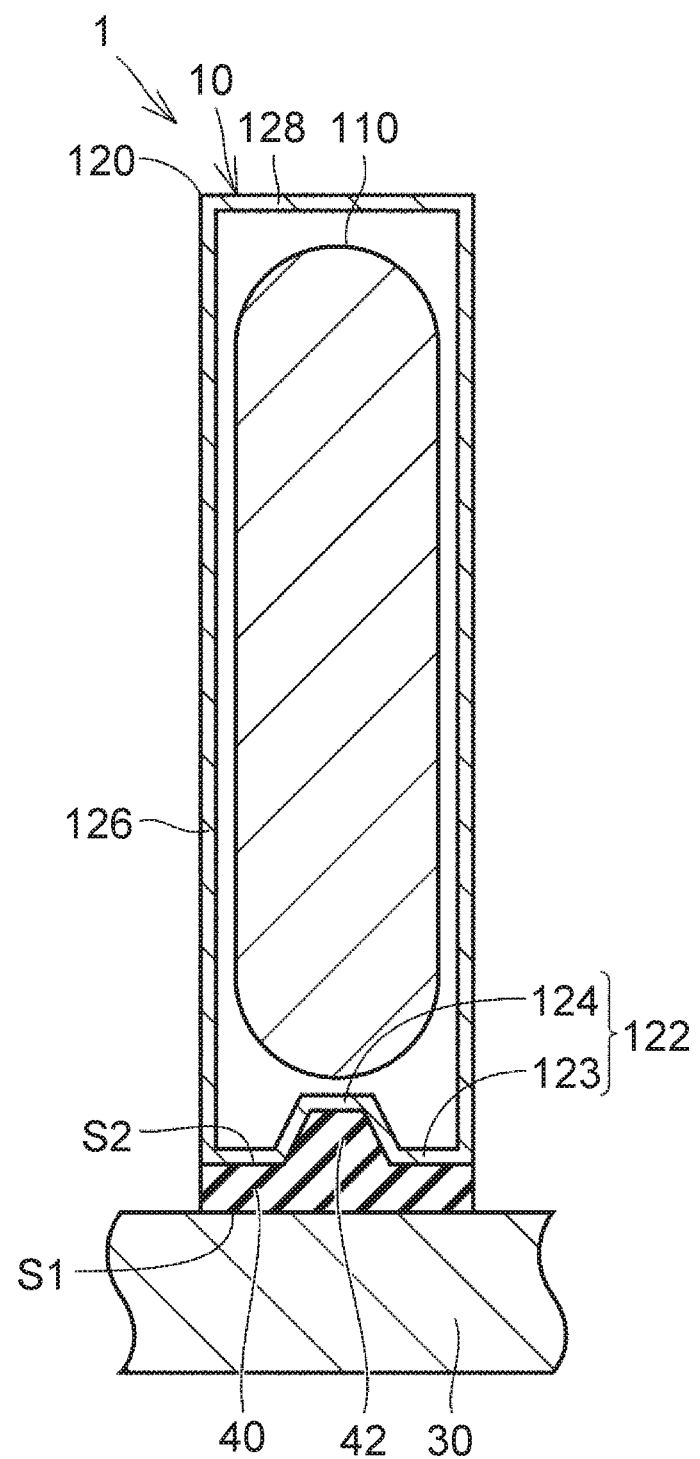
FIG. 6 is a sectional view schematically showing a modified example of the battery module of the second embodiment.

Alternatively, as shown in FIG. 6, each secondary battery 10 may be formed so as to have a single electrode body 110, and the recessed groove 124 may be formed at such a position as to overlap with the electrode body 110 in the thickness direction of the bottom wall 122.

Third Embodiment

Figure 7:
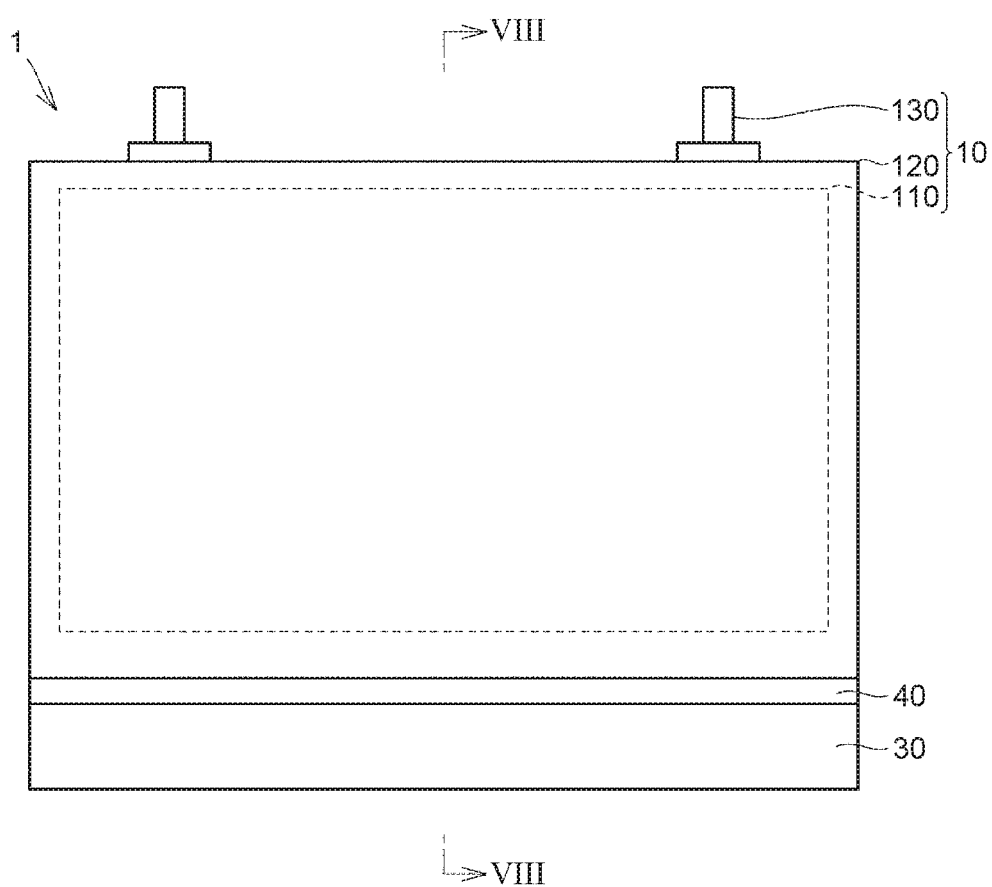
FIG. 7 is a front view schematically showing the configuration of a battery module of a third embodiment of the disclosure.
Figure 8:
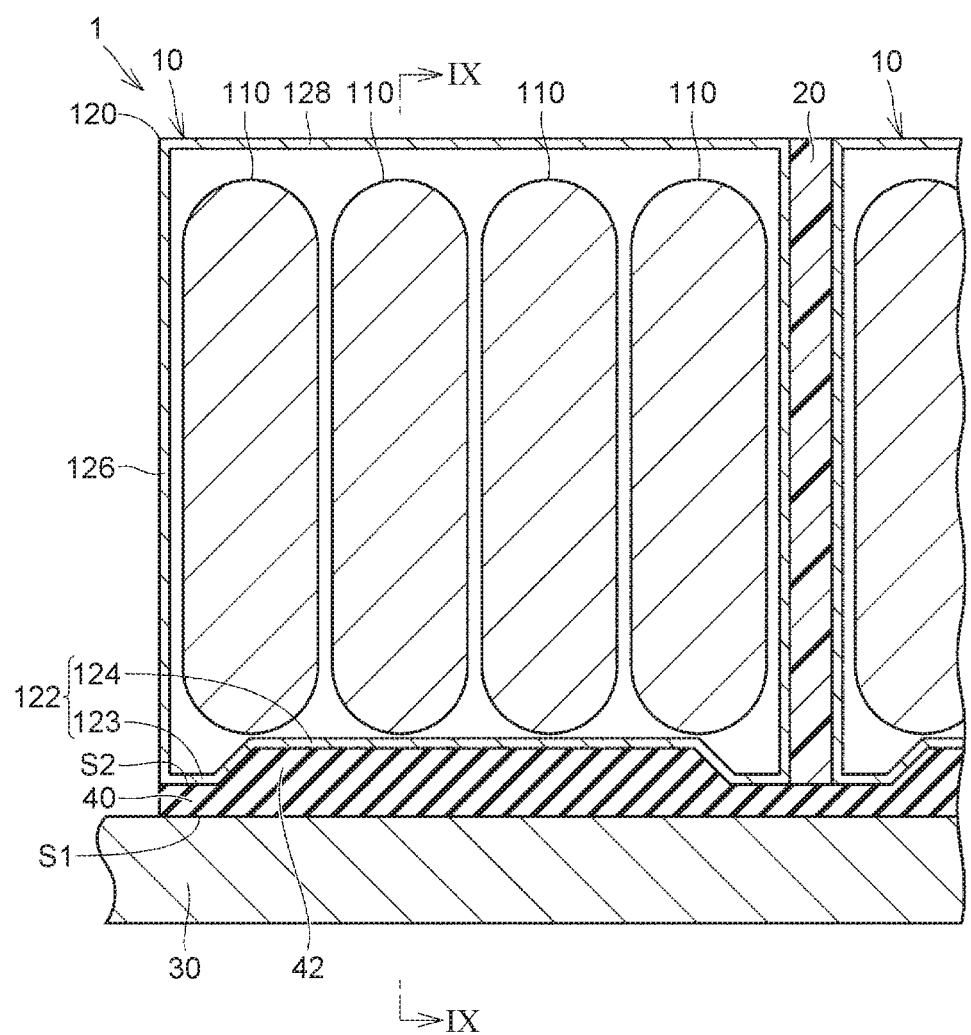
FIG. 8 is a sectional view taken along line VIII-VIII in FIG. 7.
Figure 9:
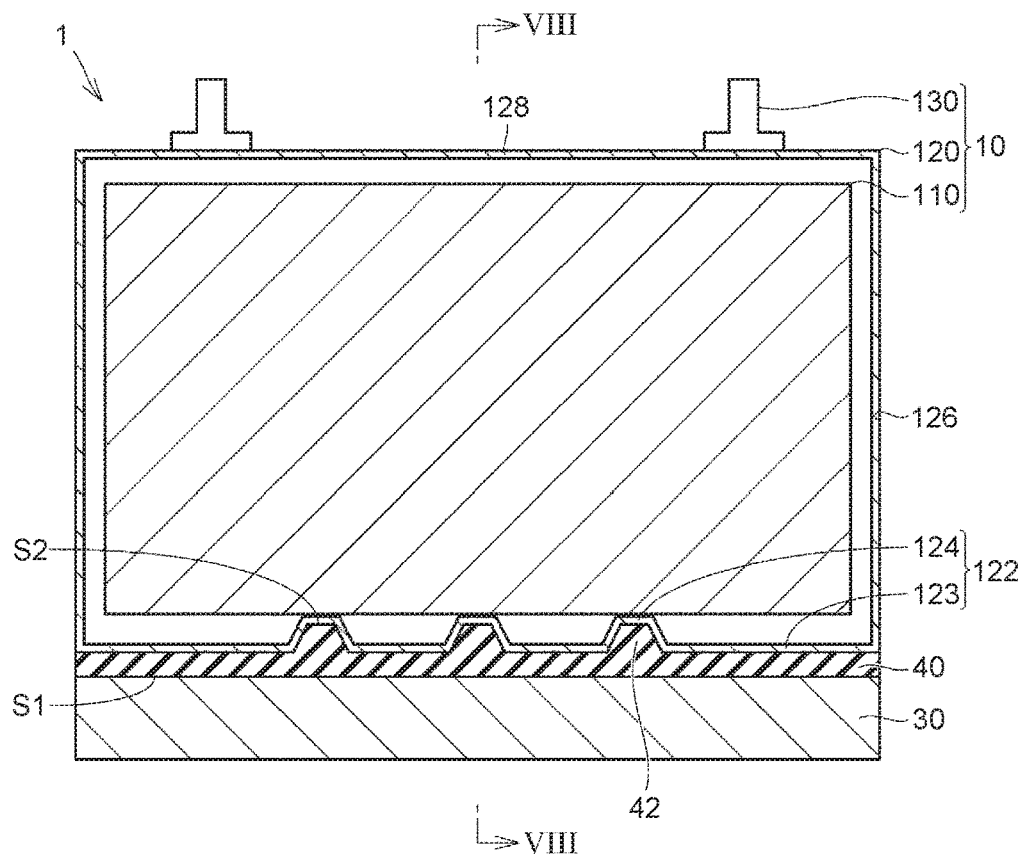
FIG. 9 is a sectional view taken along line IX-IX in FIG. 8.

Next, the battery module 1 of a third embodiment of this disclosure will be described with reference to FIG. 7 to FIG. 9. For the third embodiment, only differences from the first embodiment will be described and the same structures, workings, and effects as in the first embodiment will not be described again.

In this embodiment, a plurality of recessed grooves 124 is formed in the bottom wall 122. As shown in FIG. 9, the recessed grooves 124 are formed at intervals in the second direction (a left-right direction in FIG. 9). As shown in FIG. 8, each recessed groove 124 is shaped so as to extend in a direction parallel to the first direction (a left-right direction in FIG. 8). In this embodiment, four electrode bodies 110 are disposed inside the case 120. However, the number of the electrode bodies 110 is not limited to this example.

This aspect can enhance the rigidity of the bottom wall 122 against such deformation that the bottom wall 122 bulges outward (downward), and can thereby more reliably reduce the likelihood of deformation of the case 120.

The embodiments disclosed herein should be regarded as in every respect merely illustrative and not restrictive. The scope of the present disclosure is defined not by the description of the above embodiments but by the claims and includes all changes equivalent in meaning and scope to the claims.

Figure 10:
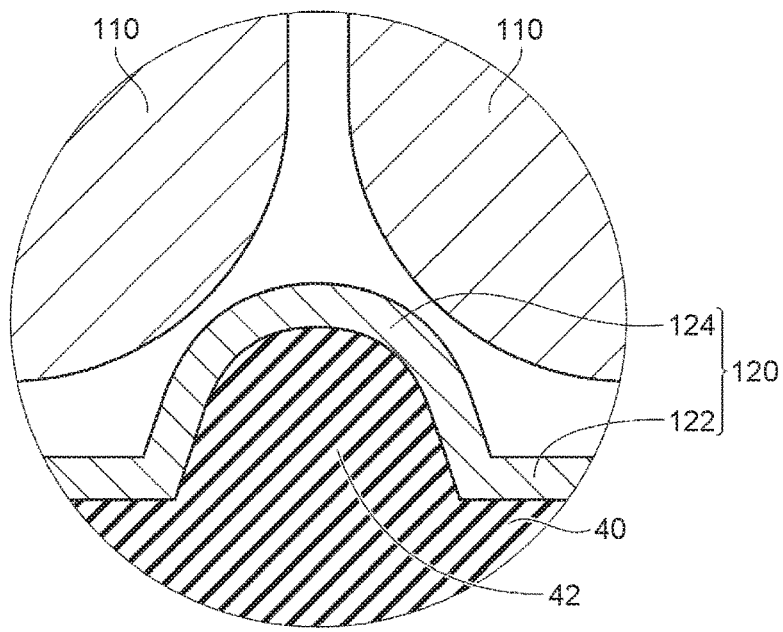
FIG. 10 is a sectional view schematically showing a modified example of a recessed groove and a protrusion.

For example, as shown in FIG. 10, the recessed groove 124 may have a curved shape that protrudes toward the inside of the case 120.

What is claimed is:

1. A battery module comprising:
   at least one secondary battery;
   a cooler that cools the at least one secondary battery; and
   a heat conducting member disposed between the at least one secondary battery and the cooler so as to bring the at least one secondary battery and the cooler into thermal contact with each other, wherein:
   the at least one secondary battery includes:
      at least one electrode body including a plurality of electrode bodies disposed in a row in a first direction; and
      a case housing the at least one electrode body;
   the case has an opposite wall facing the cooler;
   the opposite wall has a recessed groove shaped so as to be depressed toward an inside of the case;
   the heat conducting member fills a space between the opposite wall and the cooler including an inside of the recessed groove;
   the recessed groove has a pair of inclined portions and a coupling portion, the pair of inclined portions and the coupling portion are formed flat; and
   the recessed groove is formed in the opposite wall at such a position as to overlap, in a thickness direction of the opposite wall, with a gap between electrode bodies that are adjacent to each other in the first direction, and the recessed groove is shaped so as to extend in a second direction orthogonal to both the first direction and the thickness direction of the opposite wall.

2. The battery module according to claim 1, wherein the heat conducting member has:
   a cooler-side contact surface that is in contact with the cooler; and
   an opposite-wall-side contact surface that is in contact with the opposite wall including the recessed groove.

3. The battery module according to claim 1, wherein:
   the case has:
      a bottom wall formed below the at least one electrode body;
      a peripheral wall standing upright from edges of the bottom wall and shaped so as to surround the at least one electrode body; and
      an upper wall formed above the at least one electrode body and connected to an upper end of the peripheral wall; and
   the bottom wall constitutes the opposite wall.

4. The battery module according to claim 1, wherein:
   the heat conducting member is disposed also in a space between the cooler and a region between adjacent ones of the secondary batteries.

5. The battery module according to claim 1, wherein:
   the opposite wall includes a flat part; and
   the recessed groove extends partially in a direction parallel to an elongated direction of the case housing and the pair of inclined portions extend from the flat part of the opposite wall to a coupling portion of the opposite wall.

* * * * *